US010957204B1

(12) United States Patent
Kumar et al.

(10) Patent No.: US 10,957,204 B1
(45) Date of Patent: Mar. 23, 2021

(54) SYSTEMS AND METHODS FOR TRACKING CARGO ASSETS

(71) Applicant: FLEETILLA, LLC, Ann Arbor, MI (US)

(72) Inventors: Pradeep P. Kumar, Superior Township, MI (US); Pritesh R. Patel, Troy, MI (US); Mario L. Rocca, Brownstown, MI (US); Marc Wojtowicz, Farmington Hills, MI (US); Todd A. Theisen, Grosse Ile, MI (US)

(73) Assignee: FLEETILLA, LLC, Ann Arbor, MI (US)

( * ) Notice: Subject to any disclaimer, the term of this patent is extended or adjusted under 35 U.S.C. 154(b) by 0 days.

(21) Appl. No.: 16/107,439

(22) Filed: Aug. 21, 2018

Related U.S. Application Data

(60) Provisional application No. 62/672,647, filed on May 17, 2018.

(51) Int. Cl.
*H04W 4/35* (2018.01)
*G08G 1/00* (2006.01)
*H04W 4/029* (2018.01)
*G06Q 10/08* (2012.01)

(52) U.S. Cl.
CPC ........... *G08G 1/20* (2013.01); *G06Q 10/0833* (2013.01); *H04W 4/029* (2018.02); *H04W 4/35* (2018.02)

(58) Field of Classification Search
CPC .......... G08G 1/20; H04W 4/029; H04W 4/35; G06Q 10/0833; G01C 21/30; G01C 21/3446; B60T 1/0005; B60T 1/067; B60T 7/16; G01S 13/04; G08B 13/00; G08B 13/1427; G08B 13/2417; G08B 13/1436; G08B 13/19647; H04K 2203/16; H04K 3/226; H04K 3/88; Y10T 70/65
See application file for complete search history.

(56) References Cited

U.S. PATENT DOCUMENTS

| 5,278,424 A * | 1/1994 | Kagawa | G01C 19/42 250/559.37 |
| 8,760,286 B2 | 6/2014 | Bertagna et al. | |
| 9,219,978 B2 | 12/2015 | Bertagna et al. | |
| 9,781,558 B2 | 10/2017 | Bertagna et al. | |
| 10,134,277 B2 * | 11/2018 | Liu | G08G 1/096838 |
| 2003/0200024 A1 * | 10/2003 | Poreda | G08G 5/0082 701/120 |
| 2014/0213300 A1 * | 7/2014 | Spears | H04W 8/18 455/456.3 |

(Continued)

FOREIGN PATENT DOCUMENTS

| WO | WO-2018019984 A1 * | 2/2018 | ............. G01C 21/32 |
| WO | WO-2018019989 A1 * | 2/2018 | ............. G01C 21/30 |

*Primary Examiner* — Hai Phan
*Assistant Examiner* — Anthony D Afrifa-Kyei
(74) *Attorney, Agent, or Firm* — Young Basile Hanlon & MacFarlane, P.C.

(57) ABSTRACT

A method includes obtaining position information describing a first location and a second location of an asset; obtaining heading samples for the asset; determining a reference path for the asset from the first location to the second location based on the heading samples; identifying candidate paths from the first location to the second location using map information; and determining a predicted path for the asset by matching the reference path to one of the candidate paths.

20 Claims, 9 Drawing Sheets

(56) References Cited

U.S. PATENT DOCUMENTS

| | | | | |
|---|---|---|---|---|
| 2018/0341895 A1* | 11/2018 | Kislovskiy | ............. | G06Q 10/04 |
| 2018/0342033 A1* | 11/2018 | Kislovskiy | ............. | G06Q 50/30 |
| 2019/0186926 A1* | 6/2019 | Koponen | ............... | G01C 21/30 |
| 2019/0313206 A1* | 10/2019 | Lee | ....................... | H04W 4/023 |

\* cited by examiner

Spatial Domain

Time-Heading Angle Domain

US 10,957,204 B1

SYSTEMS AND METHODS FOR TRACKING CARGO ASSETS

CROSS-REFERENCE TO RELATED APPLICATIONS

This application claims the benefit of U.S. Provisional Application No. 62/672,647, entitled "System and Method to Determine and Predict Path and Distance Travelled by an Asset," which was filed on May 17, 2018, the content of which is incorporated herein by reference in its entirety for all purposes.

TECHNICAL FIELD

This disclosure relates generally to asset tracking.

BACKGROUND

The field of telematics encompasses telecommunications, vehicle technology, on-road transportation, off-road transportation, and transportation safety. Telematics systems are applied to real-time tracking of assets such as motor vehicles, trailers, and shipping containers, and can be used to track a small number of assets or an entire fleet of assets. Technologies such as a satellite positioning system (e.g. GPS) allow the position of an asset to be determined. Technologies such as wireless communication over wide area networks such as cellular telephone systems allow position information and other information to be relayed to a location that is remote relative to the asset. Thus, it is feasible to remotely monitor in near real-time, the location, movement, status and performance of assets anywhere in the world.

SUMMARY

One aspect of the disclosure is a method that includes obtaining position information describing a first location and a second location of an asset; obtaining heading samples for the asset; determining a reference path for the asset from the first location to the second location based on the heading samples; identifying candidate paths from the first location to the second location using map information; and determining a predicted path for the asset by matching the reference path to one of the candidate paths.

In some implementations, the heading samples have a higher sampling frequency than the position information. In some implementations, each of the candidate paths is a valid route from the first location to the second location using transportation network segments from the map information. In some implementations, the candidate paths are determined using an assumed speed for the asset. In some implementations, determining the predicted path includes determining a similarity score for each of the candidate paths relative to the reference path. In some implementations, the predicted path is determined as the one of the candidate paths having a highest similarity score. In some implementations, matching the reference path to one of the candidate paths includes determining statistics for the reference path and statistics for the candidate paths, and excluding one or more of the candidate paths based on the statistics for the reference path and the statistics for the candidate paths.

Another aspect of the disclosure is a method that includes obtaining a cargo asset position; identifying candidate motorized assets located near the cargo asset position; determining motorized asset paths for the motorized assets; determining a cargo asset path for a cargo asset using information obtained from a tracking device associated with a cargo asset; and matching the cargo asset to a matching motorized asset from the motorized assets based on correlation of the cargo asset path to the motorized asset paths.

In some implementations, the method includes tracking the cargo asset based on a motorized asset position for the matching motorized asset. In some implementations, the method includes periodically verifying co-location of the cargo asset and the matching motorized asset. In some implementations, the cargo asset path is estimated based on heading samples obtained during travel from a first location and a second location. In some implementations, the cargo asset path is predicted by comparing an estimated path based on heading samples obtained during travel from a first location and a second location to possible paths determined using map information. In some implementations, the information obtained from the tracking device associated with the cargo asset includes position information describing a first location and a second location of the cargo asset and heading samples for the cargo asset. In some implementations, the heading samples have a higher sampling frequency than the position information. In some implementations, matching the cargo asset to the matching motorized asset from the motorized assets based on correlation of the cargo asset path to the motorized asset paths is performed using similarity scoring.

BRIEF DESCRIPTION OF THE DRAWINGS

The description herein refers to the accompanying drawings wherein like reference numerals refer to like parts throughout the several views.

DETAILED DESCRIPTION

Figure 1:
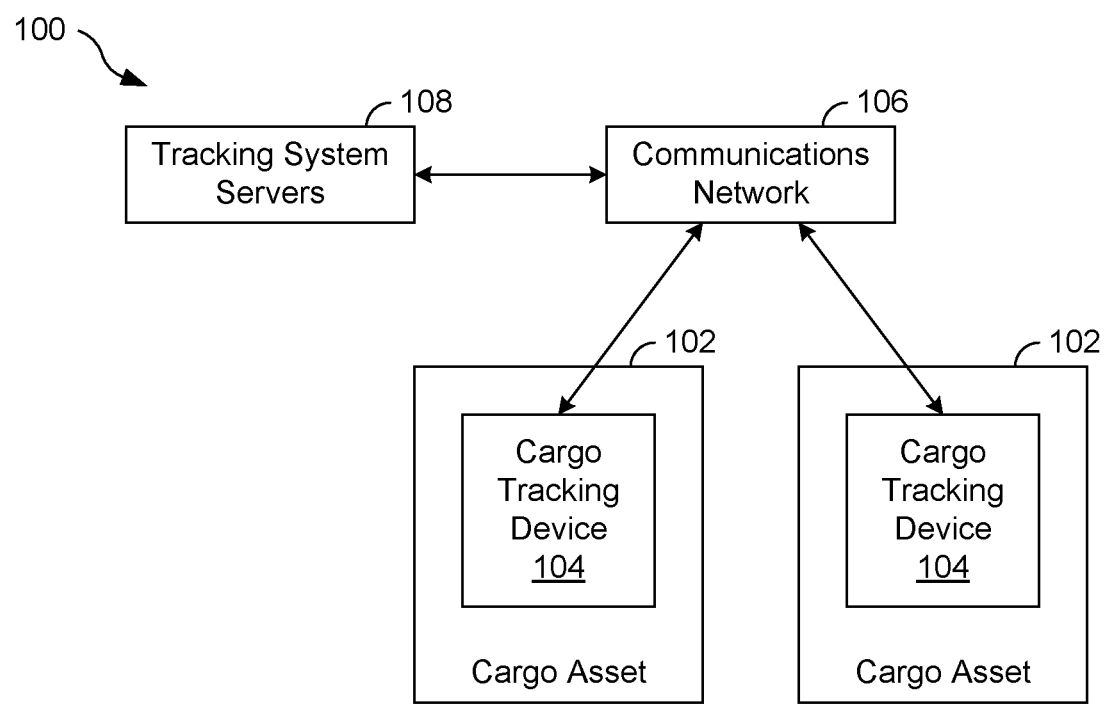
FIG. 1 is an illustration that shows an example configuration for a cargo asset tracking system.

This disclosure relates to a system and method for determining/predicting the most likely path and the distance traveled by a cargo asset based on information received from a power-constrained asset tracking device that is attached to the cargo asset. The cargo assets are typically located over a wide geographical region and are movable or intermittently movable. Typical examples of these types of cargo assets are truck trailers, cranes, construction equipment, roll-off boxes, storage boxes, generator sets, etc. The cargo asset path and distance traveled information may be determined or predicted, for example, using (a) data transmitted wirelessly from battery powered devices (or devices otherwise constrained in their ability to continuously acquire position data and transmit this information), (b) algorithms that adaptively power up sensors to control power consumption to extend the life of the battery-powered device, if necessary and (c) cloud-based mapping, geographic information systems and advanced clustering, pattern matching, machine learning algorithms and associated data processing techniques.

In order to make shipment efficient, products are typically transported on land using cargo assets such as semi-trailers, swap bodies, intermodal containers, and rail freight wagons. Typically, these cargo assets lack a built-in source of electrical power.

The cargo assets are transported from place to place by motorized assets (i.e., vehicles that pull, carry, or otherwise transport the cargo asset from place to place, also referred to as "power units"). These cargo assets are attached and detached from their power units frequently and are many times connected to many different motorized assets during the course of even a single shipment from origin to destination. For example, a shipper located in New York may contract with a trucking carrier to deliver a semi-trailer full of goods to a customer located in San Francisco. The trucking company may use a first truck to haul the semi-trailer from the shipper's yard to a trucking hub in Chicago. Then, the first truck and its driver would return to their base. The semi-trailer would then be picked up by a second truck and hauled to the final destination in San Francisco.

Trucks and other vehicles have built-in source of electrical power (e.g., a generator included in the powertrain of the truck) and often include devices that directly measure and track the distance traveled (e.g., an odometer). For example, a telematics device incorporating a cellular modem and a satellite positioning module that is attached to a truck can be powered on all of the time and can report the position of the truck to a remote location as frequently as desired. As an example, such a device that is constantly powered could be configured to report its position once per second.

Information provided by cargo assets may be useful for various business critical functions such as monthly billing, equipment maintenance, and historical analysis of routes. In addition, full cargo asset path information, from all the trailers, intermodal containers, etc. that a company owns over a period of time can provide insights into supply chain logistics planning, warehouse location, interchange hub location, etc.

Cargo assets such as semi-trailers typically do not include power sources and typically do not include devices that can directly measure and track the distance traveled. Instead, self-contained, battery-operated cargo asset tracking devices are used to obtain usage and location information. Cargo asset tracking devices are highly power-constrained, meaning that a limited amount of battery power is available to power the device over a long time period between battery changes and/or recharging (e.g., several years). Accordingly, cargo asset tracking devices have to balance operational life (or battery life) with the amount of useful information that can be provided wirelessly to a remote location. To conserve battery power and allow lengthy periods of operation, some conventional cargo asset tracking devices provide just a few position updates every day and transmit only the location of the cargo asset. Thus, the information that is provided by a cargo asset tracking device will typical lack detailed information such as information describing an actual path taken by the cargo asset, distance traveled, or a virtual odometer tagged to the cargo asset.

Knowledge of what tractor/engine or power unit is hauling which trailer or intermodal container is useful from a security standpoint and is useful for logistical purposes, such as planning and dispatching. Further, there are many situations where multiple trailers are attached to one another for certain duration of travel (such as a doubles trailer arrangement). It is also useful to know that trailers are attached in this manner and travelling together for logistics purposes such as planning and dispatching. Further, establishing a tractor-to-trailer relationship while both are traveling together allows the trailer to automatically derive a variety of tractor-related telematics data, rules and notification schemes such as (a) real-time speed and position updates (b) geo-fence configurations and real-time alert when those configured conditions occur (c) associating a driver with a trailer, etc.

Visibility into a cargo asset's activity can be obtained by a cargo asset tracking device that is mounted on the cargo asset. These devices typically contain a satellite positioning system receiver (e.g., a GPS receiver) that uses satellite signals to determine the location of the asset. The device then transmits these positions/locations at periodic intervals using a cellular or satellite link. At a central station, this data from a plurality of devices deployed in the field are tabulated and analyzed.

Due to the vast diversity of cargo assets and the fact that most of these may lack any built-in power source, it is desired that cargo asset tracking devices operate in a self-contained manner, using their own internal batteries as the power source. In this way, they are different from typical motorized asset tracking devices that are installed in a truck or car and derive power from the generator/battery of the vehicle (vehicle tracking devices). The motorized asset tracking devices can be constantly powered on and can send position information and other status information on a frequent basis. By analyzing this constant stream of position information and other operational information, the usage pattern of the motorized asset can be easily determined.

Cargo asset tracking devices, on the other hand, are self-contained and battery powered devices. They need to operate on internal batteries for years. Cargo asset tracking devices may include various modules, such as an accelerometer, magnetometer, satellite positioning (e.g., GPS) receiver, and/or a cellular transmitter. Some of these modules, such as satellite positioning receivers and cellular receivers, have relatively high power consumption requirements and must be turned off most of the time. Typical power/current consumption profile of the various modules that are part of a typical cargo asset tracking device is shown below in TABLE I.

TABLE I

|  | Current Consumption (Typical) | Wait time from power up (Typical) |
| --- | --- | --- |
| Accelerometer | 0.015 mA | 0.1 Sec |
| Magnetometer | 0.05 mA | 0.1 Sec |

TABLE I-continued

| | Current Consumption (Typical) | Wait time from power up (Typical) | |
|---|---|---|---|
| GPS Receiver | 10-50 mA | 2-60 | Sec |
| Cellular Transmitter | 100-1000 mA | 10-60 | Sec |

In order to reduce energy consumption and let the batteries of the cargo asset tracking device last several years in the field, the cargo asset tracking device sends just a few position updates a day. When not transmitting, these devices stay in a "sleep" mode, with the communication module and the satellite positioning receiver module turned off. Thus, the cargo asset tracking device is usually in the sleep mode and exits the sleep mode only momentarily a few times per day.

A few position updates per day provide only limited insight regarding the location and usage of a cargo asset. However, additional information regarding usage of the cargo asset, such as the approximate path and distance traveled, is desired to derive important actionable intelligence. While satellite positioning system receivers coupled with cellular transmitters can provide sufficient information when they are operating constantly, doing so is not practical for a battery powered device.

The systems and methods described herein collect and report data from a cargo asset, and use the data to analyze, compute and predict most likely path traveled and distance traveled. Data collection takes place in a constrained environment in the systems and methods described herein. The constraints may be the result of the need for the device to be in ultra-low power mode to save battery life. Alternately, the device may be constrained in some other manner (sky or location beacon visibility) and is able to collect and/or transmit location information only intermittently. The monitoring device can be installed in any orientation on most cargo assets, without calibration. Communications modules and satellite positioning system modules are powered on only infrequently. Data is reported in a flexible manner so that the prediction of path and related information can be done by remote gateway software.

To predict the most likely path and the distance traveled, the usage profile contemplated in the present invention assumes that the cargo asset travels via well-known pathways such as roads, in-land waterways, rail lines, etc. To identify what motorized asset that cargo asset may be attached to, telematics data from the motorized asset is accessed from a cloud-based service. Computed path data from the cargo asset (e.g., trailer) is correlated (in time and space) with data from a motorized asset to decide if they are paired.

FIG. 1 is an illustration that shows an example configuration for an asset tracking system 100. In the illustrated example, the asset tracking system 100 is used to remotely track positions, paths, and other operational information for cargo assets 102. The cargo assets 102 each include a cargo asset tracking device 104. A communications network 106 (e.g., a cellular or satellite communications network) is used by the cargo asset tracking devices 104 to communicate with asset tracking servers 108.

Each of the cargo assets 102 is a physical structure or machine that is mobile, and may be transported from place to place. As one example, the cargo assets 102 may include trailers and other containers that are utilized to transport goods over long distances. Assets that are able to move under their own power may be referred to herein as motorized assets, and motorized assets can be used to transport the cargo assets. Examples of motorized assets include trucks (including, for example, a semi-trailer truck that is configured to tow semi-trailers), train engines, and ships. Cargo assets typically do not include their own source of motive power. Examples of the cargo assets 102 include semi-trailers, intermodal containers, and railroad cars. Although the illustration shows two of the cargo assets 102, it should be understood that a large number of the cargo assets 102 (e.g., thousands) can be included in the asset tracking system 100.

The cargo asset tracking devices 104 are typically self-contained, autonomous battery-powered devices. The cargo asset tracking devices 104 are each mounted on a respective one of the cargo assets 102. By inclusion of wireless communications hardware, as will be described herein, the asset tracking devices are able to send information, obtained from included sensors or from systems associated with the cargo assets 102, to the asset tracking servers 108 using the communications network 106. As an example, a cellular data transmission from one of the asset tracking devices 104 can be relayed to the asset tracking servers 108 by the communications network 106 to provide position information to the asset tracking servers 108.

The asset tracking servers 108 may include one or more computer devices. Some or all of the asset tracking servers 108 may be accessible via the Internet. The asset tracking servers 108 include applications that implement asset tracking functions. Examples of these applications include mapping applications, geographic information applications and asset monitoring applications that track, display, plot, and report the status of the cargo assets 102 to end users. The asset tracking servers 108 are also configured to identify and analyze the data that is received from the asset tracking devices 104.

The systems and methods described herein can be implemented using the asset tracking servers 108. As an example, the asset tracking servers 108 may be implemented as a cloud-based processing system. The asset tracking servers 108 may include GIS (Geographic Information System) database (also referred to as map data) for the relevant area of travel for the cargo assets 102. For example, for cargo assets located and traveling within the continental United States, a map database including known roads, rail roads, rivers and other travel pathways in United States or North America would be available to the asset tracking servers 108. This database may reside internally within the cloud-based processing system or made accessible externally via a service that is accessible using an application programming interface or other suitable data access mechanism.

Figure 2:
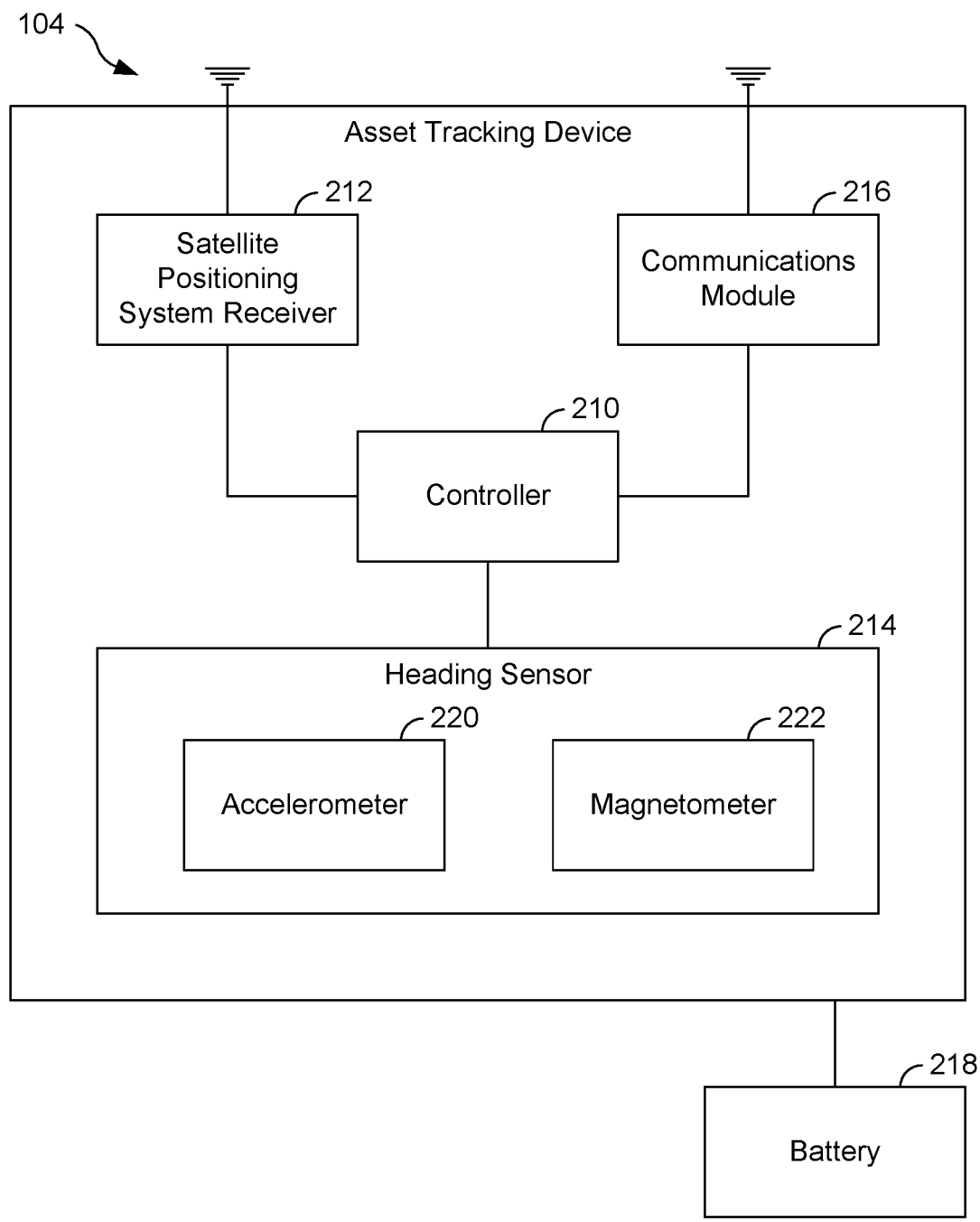
FIG. 2 is a block diagram that shows an example configuration for the cargo asset tracking device.

FIG. 2 is a block diagram that shows an example configuration for the cargo asset tracking device 104. The cargo asset tracking device 104 may include a controller 210, a satellite positioning system receiver 212 (e.g., a GPS receiver), a heading sensor 214, a communications module 216 (e.g., cellular or satellite modem), and a battery 218. To the extent possible, the controller 210, the satellite positioning system receiver 212, the heading sensor 214, and the communications module 216 may each be implemented using low power consumption components.

The controller 210 is a computing device that is provided with program instructions that cause it to perform functions as described herein. The controller 210 is able to receive data from and/or send commands to other components such as the satellite positioning system receiver 212, the heading sensor 214, and the communications module 216. The controller 210 is also operable to regulate operation of the battery 218. Further, the controller 210 is able to power up and power down each of the other modules/components such as the satellite positioning system receiver 212, the heading sensor 214, and the communications module 216 in order to optimally regulate energy consumption and extend the useful life of the integrated battery.

The heading sensor 214 is operable to output a heading value to the controller 210, which indicates the orientation and/or direction of travel of the cargo asset 102 that is associated with the cargo asset tracking device 104. The heading sensor 214 is a low-power, self-contained sensing module. Any suitable technology can be utilized to implement the heading sensor 214. In the illustrated example, the heading sensor 214 includes an accelerometer 220 and a magnetometer 222. The accelerometer 220 outputs acceleration values and related signals, and may be utilized for tilt compensation and activity/movement detection. The magnetometer 222 outputs a signal representing earth's magnetic field strength. Both the accelerometer 220 and the magnetometer 222 output three sets of values, corresponding to the three physical dimensions (i.e., 3-D space).

The accelerometer 220 outputs a signal that can be utilized for activity detection. For example, motion of the cargo asset tracking device 104 will be detected by the accelerometer and reflected in the data output by it. The data output by the accelerometer may include, or be processed to generate, a signal (sometimes referred to as an interrupt signal or indicator signal) when movement is detected. In this way, movement or vibration can be detected with practically no computing power or battery drain. The magnetometer 222 is a device capable of detecting the earth's magnetic field (i.e., a magnetic field sensor) in order to determine orientation.

As an example, the heading sensor 214 can be an e-compass, which is a tilt compensated electronic orientation sensor module that includes an accelerometer 220 and a magnetometer 222 as in the illustrated example. In known e-compass implementations, a three-axis magnetic sensor, such as the magnetometer 222, produces output proportional to the earth's magnetic field. These raw values can be used to determine the orientation of the magnetic sensor (e.g., relative to cardinal directions) by applying known corrections. The output from the magnetic sensor will change when the cargo asset 102 changes its direction such as movement of a trailer. The readings from the magnetic sensor will also be typically different even if the cargo asset 102 is located at a different location, but in the same direction. Using signals output by the accelerometer 220 and the magnetometer 222 and well-known algorithms, a tilt-compensated e-compass can be created. This module provides the 'heading' or direction information of the cargo asset 102, continuously or as needed, in an ultra-low power state. Tilt-compensation provides additional flexibility on how the cargo asset tracking device 104 can be mounted. The heading sensor 214 can be implemented, for example, using known, commercially available, low-power e-compass modules.

For the purposes of simplicity, the terms e-compass and/or heading sensor used in further discussions below implies a subsystem consisting of an accelerometer, a magnetometer (or a similar device) and computer program instructions (e.g., encoded in software, firmware, an ASIC, an FPGA or other suitable form either internally or as part of an external controller) that can produce (a) movement indication and (b) heading/direction information. Further, accurate asset heading information is available irrespective of how the cargo asset tracking device 104 is mounted and irrespective of movement of the cargo asset 102.

Tilt-compensated heading computation involves using raw magnetometer and accelerometer values and then using well known algorithms for calibration, corrections for orientation, hard and soft iron effects, etc. Many times, the small microcontrollers used in battery powered systems may have only limited computational ability. In these situations, the raw values (from magnetometer and accelerometer) can be sent to the cloud-based server system and actual heading can be computed on the server. For simplicity e-compass is assumed to be a system that provides a heading value, whether the heading value is computed locally by the cargo asset tracking device 102 and then sent to the remote server or the raw values are sent to a remote server and then the heading is determined from the raw values by well-known algorithms at the remote server.

The battery 218 is an integral part of the cargo asset tracking device 104, which allows the cargo asset tracking device 104 to operate without power derived from the cargo asset 102. This allows the asset tracking device to be used with cargo assets that do not incorporate a power source. The battery 218 may be non-rechargeable or rechargeable from a source such as a solar panel. The battery 218 is expected to last long periods of time (years) in extreme climatic conditions. Further, in order to be practical, overall size of the cargo asset tracking device and hence the amount of battery capacity that can be integrated into the device needs to be kept to a minimum. In order to be useful, data with as much granularity as possible needs to be collected and this requires the various sensor modules within the cargo asset tracking device 104 to be active and sampling data as frequently as possible. All of these conflicting considerations require judicious use of battery capacity within the cargo asset tracking device 104.

Because the cargo asset tracking device 104 needs to operate for years on a battery, all modules (e.g., the satellite positioning system receiver 212, the heading sensor 214, and the communications module 216) are usually turned off and are powered up on an as needed or periodic basis only. The controller 210 stays in a low power mode, consuming very little power. At periodic intervals (e.g., 10 second intervals), when the movement indication gating signal from the heading sensor 214 is present, the controller 210 wakes up into a higher power state to sample and store heading information from the heading sensor 214. Successive heading samples at a pre-determined, short interval (such as every 10 seconds) are collected and stored when the movement indicating gating signal from heading sensor 214 is present.

At periodic/infrequent intervals that represent a pre-determined number of heading samples (e.g., 90 heading samples or every fifteen minutes if the heading samples are taken once every 10 seconds) an absolute location sample is collected from the satellite positioning system receiver 212 or from another suitable device such as a Bluetooth location beacon. The pre-determined sample interval/multiple used for absolute position determination would depend on the nature of asset usage, typical expected travel speed of the cargo asset 102, the amount of battery capacity available and the expected battery life of the cargo asset tracking device 104, and/or other factors relating to operation of the cargo asset tracking device 104.

As demonstrated by the power consumption data provided in table 1, the above strategies are intended to extract the maximum benefit out the limited amount of battery power that is available to the cargo asset tracking device 104, by powering up high power consumption modules such as GPS receivers and cellular transmitters very infrequently (e.g., every 15 minutes or so) and powering up ultra-low power modules such as the e-compass more frequently (e.g., every 10 seconds).

In some implementations, instead of obtaining an absolute position measurement after a pre-determined number of heading samples have been obtained, an adaptive scheme is utilized to determine the number and frequency of collection of absolute position measurements. Factors used in determining frequency of absolute position measurement collection can include time elapsed since the last absolute position measurement using the satellite positioning system receiver 212, cumulative heading changes measured using the heading sensor 214 since the last absolute position measurement, and/or rate of change of the heading. As one example, the absolute position measurement collection frequency can be determined based on these and/or other factors. As another example, an absolute position measurement can be collected in response to determining that one or more of these values (e.g. cumulative heading changes measured using the heading sensor 214 since the last absolute position measurement) has exceeded a threshold value.

As will be explained herein, operation of the cargo asset tracking device 104 may be configured produce asset heading/direction data when an asset movement indicator (e.g., from the accelerometer 220) is present. The asset heading/direction data is obtained and stored by the controller 210 at frequent intervals (e.g., once every 10 seconds) in an operating mode that uses a minimal amount of power from the battery 218 (i.e., a battery-constrained operating mode). The cargo asset tracking device 104 is also configured to obtain an absolute position measurement representing the location of the cargo asset 102 using the satellite positioning system receiver 212 at an infrequent interval (e.g., every fifteen minutes or after a predetermined number of heading samples are obtained).

Figure 3:
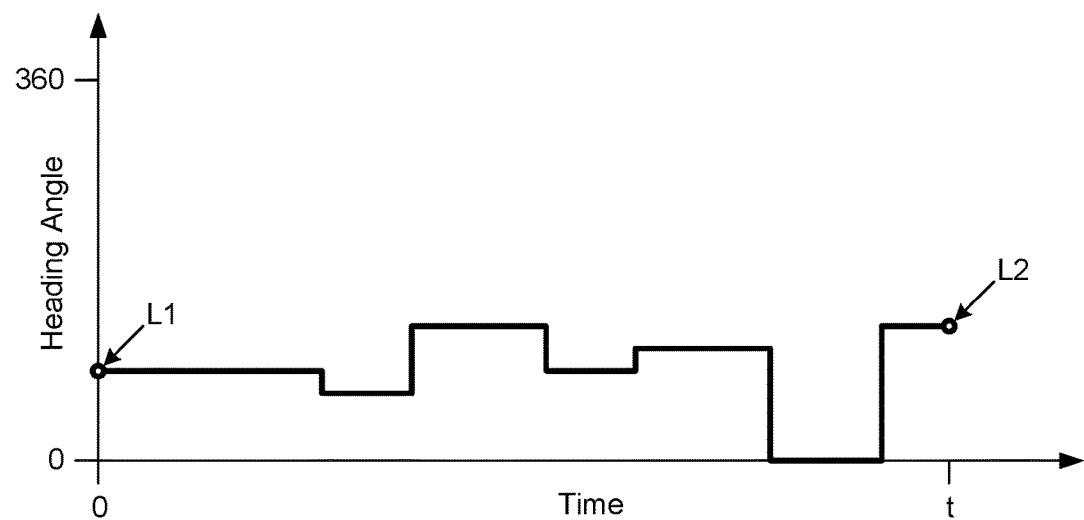
FIG. 3 is an example of a graphical representation of heading data samples.

FIG. 3 is an example of a graphical representation of heading data samples obtained using the heading sensor 214. The data collected between two locations for which absolute position information is available would be of the general form:

Location: L1 (Latitude-1, Longitude-1); L2 (Latitude-2, Longitude-2)

Time: T1 & T2 (time of the two location samples L1 & L2 above)

Heading: H1, H2, H3, Hn (heading samples taken between L1 & L2 above—actual heading samples or raw accelerometer and magnetometer values suitable for conversion to heading remotely on the cargo asset tracking server)

At periodic intervals (usually some multiple of the times when absolute position samples are taken via GPS), the communications module 216 is powered on by the controller 210, and is utilized to transmit stored data (e.g., absolute position measurements, heading values, and associated time stamps) to a remote server, such as the asset tracking servers 108, where the data is analyzed.

Figure 4:
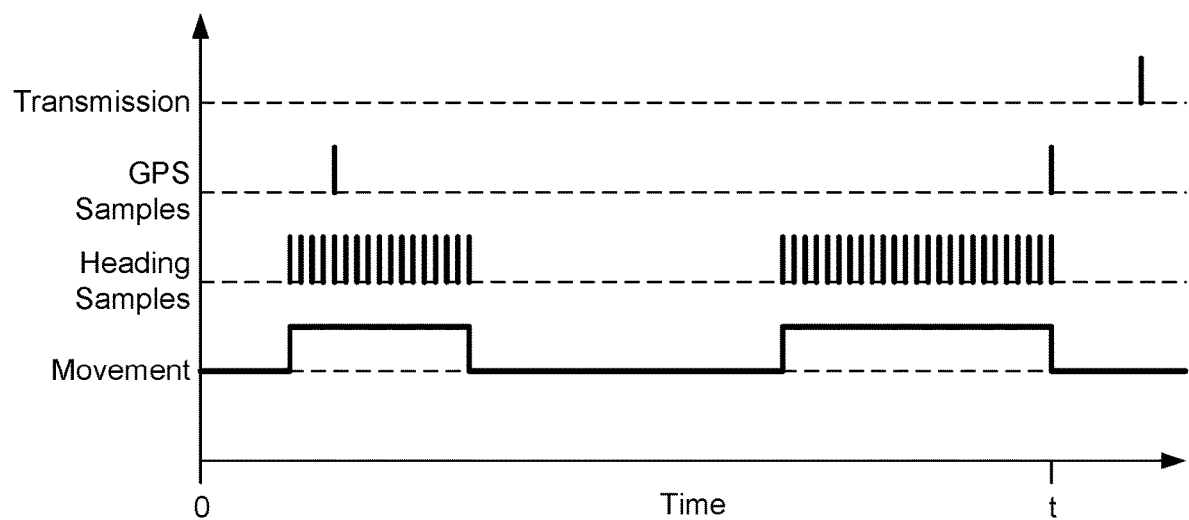
FIG. 4 is a diagram that shows the timing and temporal relationship between data samples collected and subsystem power up and power down within a cargo asset tracking device.

FIG. 4 is a diagram that shows the timing and temporal relationship between data samples collected and subsystem power up and power down, including instances of transmissions to the asset tracking servers 108 using the communications module 216, instances of obtaining absolute position measurements using the satellite positioning system receiver 212, instances of obtaining heading samples using the heading sensor 214, and time periods corresponding to no movement of the cargo asset 102 (low portions of line) and time periods corresponding to movement of the cargo asset 102 (high portions of line).

The asset tracking servers 108 analyze (e.g., in near real-time) the data transmitted from each of the cargo asset tracking devices 104, to determine the most likely path taken by the cargo asset 102. As will be explained further herein, the data from the cargo asset tracking devices 104 can be used to predict an actual path traveled and a distance traveled between the two known locations L1 and L2 that are identified using absolute position measurements by analyzing the heading information samples between these two locations and map information to search and find a likely fit between the heading data from the cargo asset 102 and actual pathways (roads, rail lines, etc.) that are available for travel. With the advent of advanced analytics and prediction schemes such as machine learning, clustering, pattern matching, etc. those skilled in the art will recognize that a variety of different approaches can be applied to achieve the processing objectives and predict the actual path traveled by the cargo asset 102. Those skilled in the art will also realize that there are many ways to filter and extract spatial data according to well-known spatial algorithms such as network traversal, distance, and nearest neighbor.

Figure 5:
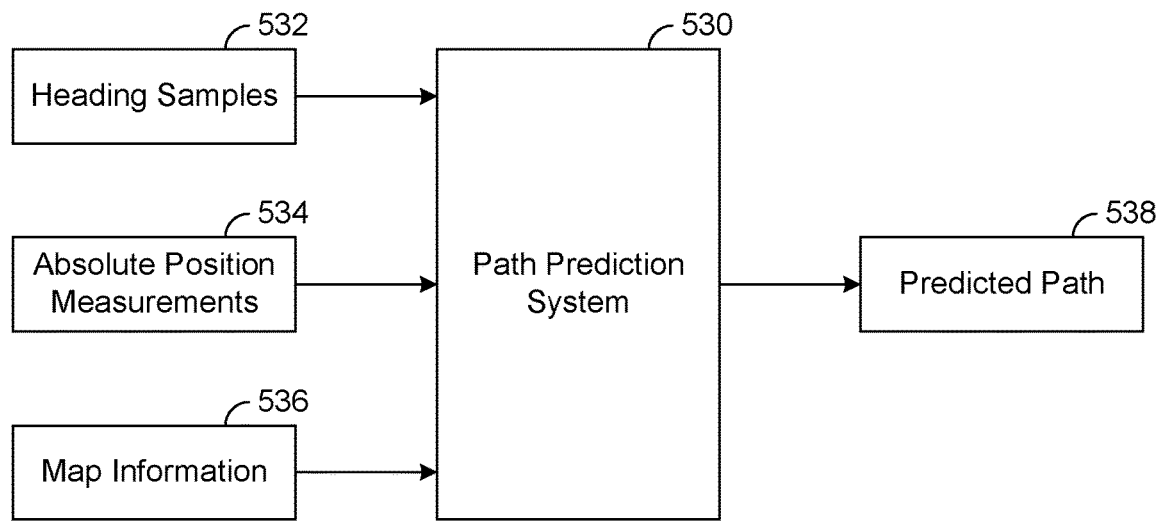
FIG. 5 is a block diagram that shows an example of a path prediction system.

FIG. 5 is a block diagram that shows a path prediction system 530 that is operable to predict a path that was traveled by the cargo asset 102 during a time period based on information obtained by the cargo asset tracking device 104 that is associated with the cargo asset 102. The inputs that are obtained and utilized by the path prediction system include heading samples 532, absolute position measurements 534, and map information 536. As an output, the path prediction system generates the predicted path 538 of the cargo asset 102.

The heading samples 532 are the outputs provided by the heading sensor 214, as previously described, and represent the travel direction of the cargo asset 102, measured at short time intervals (e.g., ten second intervals). The absolute position measurements 534 are the outputs provided by the satellite positioning system receiver 212, as previously described, and are measured at long time intervals (e.g. fifteen-minute intervals). Each of the absolute position measurements represents the geospatial location (e.g., latitude, longitude, and optionally elevation) of the cargo asset 102 at a particular point in time. The time intervals for measuring the heading samples 532 are smaller than the time intervals for measuring the absolute position measurements 534. For example, the frequency of the heading samples 532 can be at least four times the frequency of the absolute position measurements 534. In the implementations described herein, the frequency of the heading samples 532 is approximately ninety times the frequency of the absolute position measurements 534.

The map information 536 is obtained from a map database or other system that includes information that defines the location, extents and connectivity of a transportation network. The map information can include, for example, data elements that correspond to portions of a road or path, expressed geometrically, such as in the form of starting and ending points of segments, which may be linear, curved, or irregular.

The path prediction system uses the heading samples 532 to define a reference path P-0. The reference path P-0 is an estimate of the shape of the path traveled by the cargo asset 102. The result is a path that is related to the actual path traveled by the cargo asset 102 but will deviate from it due to the sampling interval and due to deviations in the actual speed of the cargo asset 102 from the assumed speed that is used to create the reference path P-0.

A graphical representation of the reference path P-0 is created and is referred to herein as reference path diagram PD-0. As an example, the reference path diagram PD-0 may be generated in a raster format based on the heading samples. FIG. 3 is an illustration that shows an example of the reference path diagram PD-0.

The reference path diagram PD-0 and the map information 536 are used to determine the predicted path 538. The predicted path 538 is a path that extends from the first location L1 to the second location L2 and is constructed using road segments, rail segments, or other transportation network segments that are located between the first location L1 and the second location L2.

Figure 6:
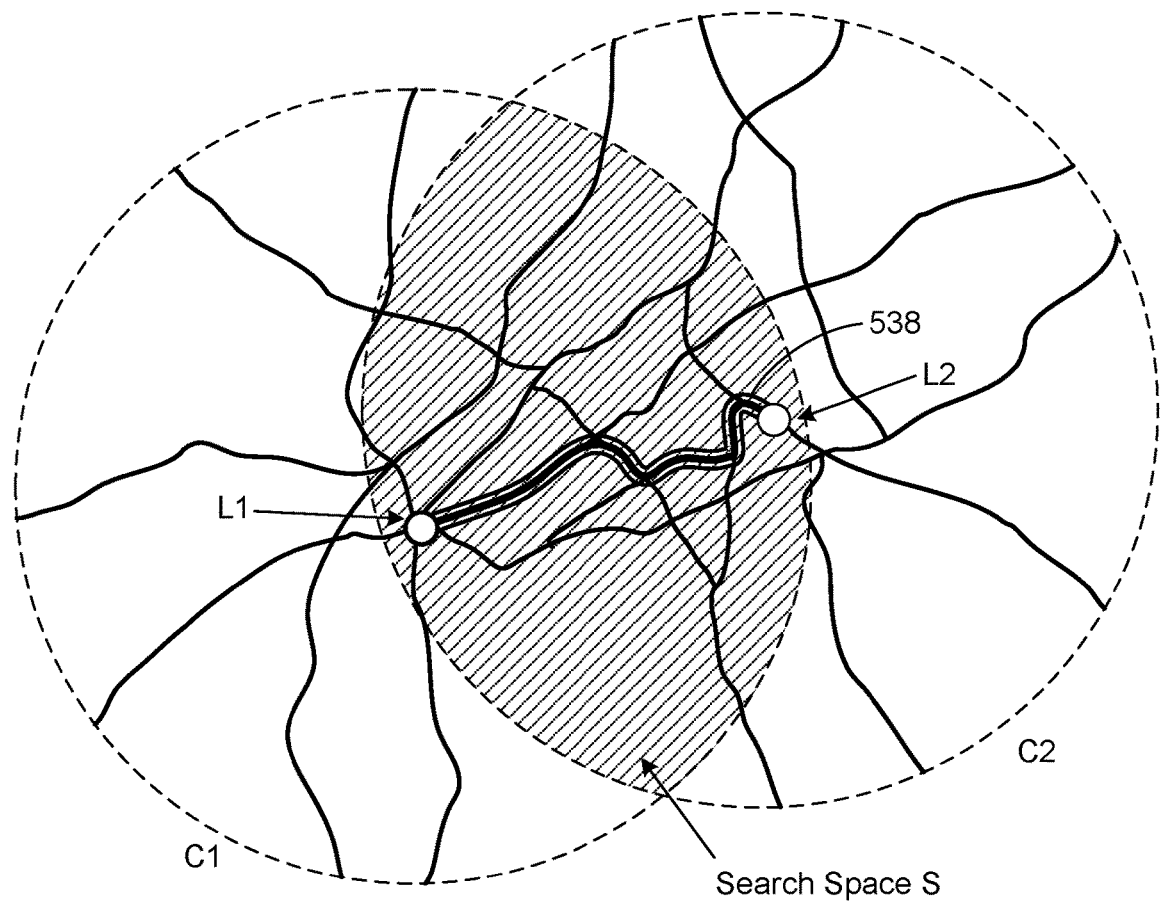
FIG. 6 is an illustration that shows an example of a first circular region, a second circular region, and a search space used by the path prediction system.

The path prediction system 530 identifies the predicted path 538 from the reference path diagram PD-0 by analyzing the map information 536 within a first circular region C1, a second circular region C2, and a search space S. FIG. 6 is an illustration that shows an example of the first circular region C1, the second circular region C2, and the search space S that may be used by the path prediction system 530.

The first circular region C1, the second circular region C2, and the search space S are defined by first determining a maximum viable speed for the cargo asset 102, which is based on the type of motorized assets that are typically used to transport the cargo asset. For example, the maximum viable speed for a semi-trailer may be set to 120 miles per hour when it is expected to be transported by a semi-trailer truck. Based on the maximum viable speed, a maximum distance R is computed, representing the longest straight-line distance that can be traveled by the cargo asset 102 in a time interval between a first time T1 that corresponds to presence of the cargo asset 102 at the first location L1 and a second time T2 that corresponds to presence of the cargo asset 102 at the second location L2. This time interval may be referred to as time interval T2-T1.

Using the distance R as radius, the first circular region C1 is constructed around the first location L1 and the second circular region C2 is constructed around the second location L2 so as to encompass all possible locations where the cargo asset 102 could have been located during the time interval T2-T1. The first circular region C1 and the second circular region C2, in combination (e.g., geometric union), define a data filter that can be applied to the map elements 536 to obtain map elements that correspond the possible locations where the cargo asset could have been located. Map elements (road segments, rail segments, etc.) within this area are obtained from the map information 536.

The search space S is defined based on the first circular region C1 and the second circular region C2. For example, the spatial search space S may be defined as an area that is common (i.e., overlapping) to the first circular region C1 and the second circular region C2. Thus, geometrically, the spatial search space S may be defined as the geometric intersection of the first circular region C1 and the second circular region C2. Because the search space S is defined as the intersection of the first circular region and the second circular region, it is not circularly-shaped, but rather has a biconvex shape. By defining the search space S in this manner, further processing to determine the predicted path 538 based on the reference path PD-0 and the map elements is made more efficient by reducing the range and scope of options to be evaluated, which reduces the computational resources required for the analysis. In particular, the path that was followed by the cargo asset 102 must have traveled through the search space S, and paths that do not pass through the search space S entirely can be eliminated from consideration.

Subsequent to determination of the search space S, the path prediction system 530 determines multiple candidate paths, which are referred to herein as candidate paths P-1 through P-n. The candidate paths P-1 through P-n are determined by searching within the search space S above using spatial search techniques such as Network Traversal and Nearest Neighbor to list some or all of the possible paths from the first location L1 to the second location L2. Each of the candidate paths P-1 through P-n may be defined by a series of transportation network segments, based on the map information 536, that extend from the first location L1 to the second location L2 and can be utilized to navigate from the first location L1 to the second location L2. Each of the candidate paths P-1 through P-n represents a viable or plausible path or route through the relevant transportation network that the cargo asset 102 may have taken as it was transported from location L1 to location L2.

The candidate paths P-1 through P-n may be generated in a manner that is geography and asset dependent to avoid including paths in the candidate paths P-1 through P-n that are not compatible with the geography and the cargo asset. For example, some cargo assets travel only on roadways (such as truck trailers), and the possible pathways for these cargo assets can be limited to the road network, to the exclusion of other types of facilities, such as rail facilities. For intermodal containers that are transported on road and by rail, the possible pathways may be defined as including both road and rail network. For rail wagons that travel only on rail lines, the possible pathways may be limited to only portions of the rail network, to the exclusion of other facilities, such as the road network. Information describing the asset type may be associated with each of the cargo asset tracking devices 104 and made available to the path prediction system 530 to allow generation of candidate paths in dependence on asset type and transportation facility type.

In some implementations, statistical data can be determined for the reference path P-0 and the candidate paths P-1 through P-n. The statistical data for each path can include, as examples, a distance value, a cumulative heading value, a value representing the number of significant heading transitions along the path. These statistics can be used as part of a similarity comparison. Optionally, some of the candidate paths P-1 through P-n can be eliminated from further analysis, for example, if a statistical value computed for the respective one of the candidate paths P-1 through P-n differs from the statistical value computed for the reference path P-0 by more than a threshold value.

Figure 11:
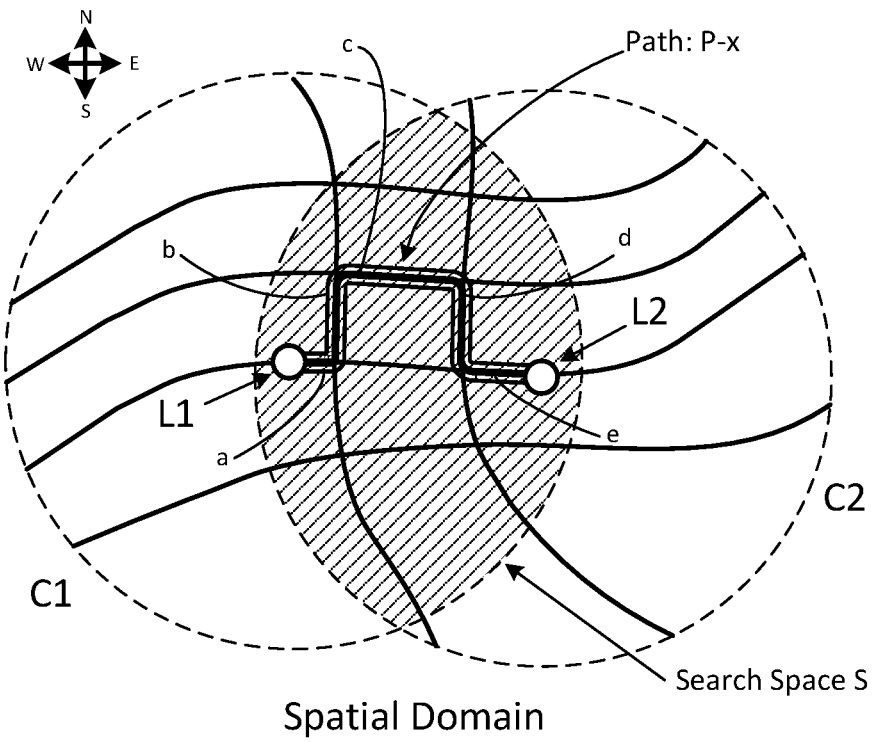
FIG. 11 shows a candidate path P-x in the spatial domain.
Figure 12:
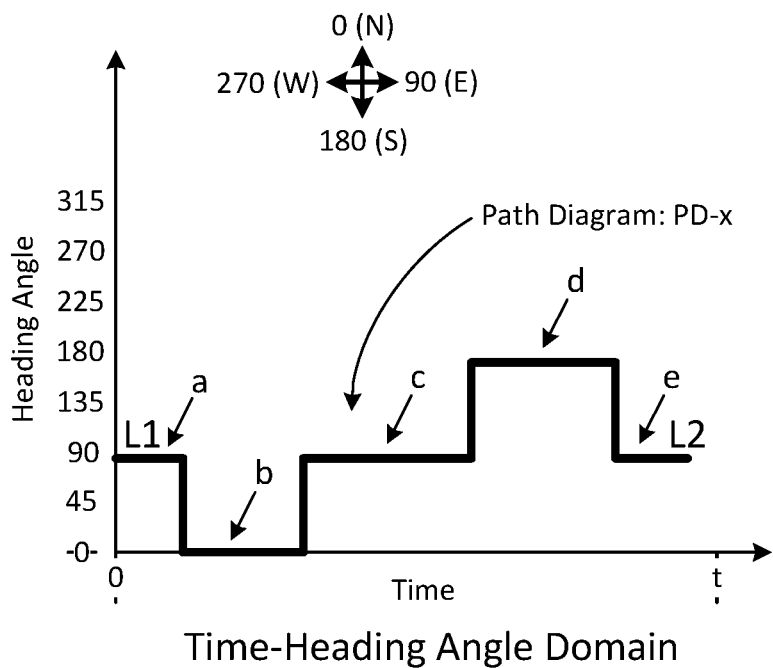
FIG. 12 shows a candidate path diagram PD-x that is equivalent to the candidate path P-x in the time-heading angle domain.

The candidate paths P-1 through P-n are processed to generate respective candidate path diagrams, which are referred to herein as candidate path diagrams PD-1 through PD-n. While the paths P-1 through P-n are transportation network diagrams in the spatial domain, the path diagrams PD-1 through PD-n are heading angle transitions in time domain, similar in structure to reference path diagram PD-0. As an illustration, FIGS. 11-12 show an example candidate path P-x in the spatial domain (FIG. 11) and its equivalent path diagram PD-x (FIG. 12) as heading transitions in time domain. In order to convert the distance values for the various road and rail segments into the time domain, either an average speed based on asset category or posted speed limits for each segment may be used. The result is a collection of path diagrams in a general format as the reference path diagram PD-0. One of these candidate path diagrams is closely related to the reference path diagram PD-0, but will deviate from it due to (a) artifacts arising out of sampling interval used for obtaining the heading samples from the cargo asset tracking device 104 and (b) deviations in the actual speed of the cargo asset 102 from the assumed speed that is used to create the candidate path diagram. For subsequent processing and comparison with the reference path diagram PD-0, the reference path diagram PD-0 and the candidate path diagrams PD-1 through PD-n can be scaled to have a common length straight-line length between their endpoints, which correspond to the first location L1 and the second location L2. The reference path diagram PD-0 and the candidate path diagrams PD-1 through PD-n are described here and illustrated in FIG. 3 and FIGS. 11-12 as graphical elements in a Cartesian coordinate format. Heading represents angular information that ranges between 0 and 360 degrees and those skilled in the art would recognize that other equivalent graphical coordinate formats such as polar diagrams, spider charts, etc. may be used to create the path diagrams.

The path prediction system 530 uses the reference path diagram PD-0 and the candidate path diagrams PD-1 through PD-n to determine the predicted path 538. In particular, the path prediction system 530 may select one of the candidate path diagrams PD-1 through PD-n for use as the predicted path 538 based on similarity of the candidate path diagrams PD-1 through PD-n to the reference path diagram PD-0.

Figure 7:
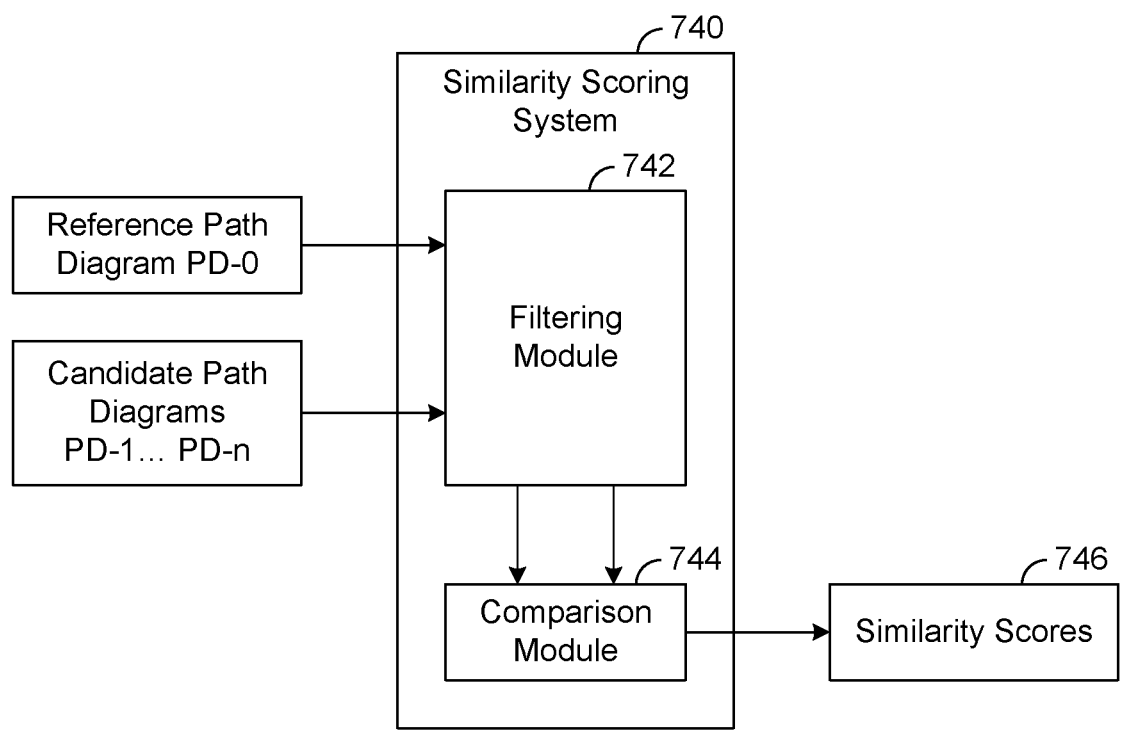
FIG. 7 is a block diagram that shows an example of a similarity scoring system that may be included in the path prediction system.

To assess similarity, the path prediction system 530 may incorporate a similarity scoring system 740, as shown in FIG. 7. In the illustrated example, the similarity scoring system 740 includes a filtering module 742, and a comparison module 744. Inputs include the reference path diagram PD-0 and the candidate path diagrams PD-1 through PD-n. Outputs include similarity scores 746 for some or all of the candidate path diagrams PD-1 through PD-n. The candidate path corresponding to the candidate path diagram that has the highest score from the similarity scores 746 can be selected by the path prediction system as the predicted path 538.

The filtering module 742 and the comparison module 744 may use filtering and comparison algorithms that analyze the presence, location, order, and configuration of significant features of the path diagrams that represent large heading transitions or distinctive groups of heading transitions. An example of a significant heading transition that may be useful for comparison and filtering is a change in heading such as turn to the right or a turn to the left (e.g., an approximately +1-90 degree change). The sequence of these heading transitions from the reference path diagram PD-0 and the candidate path diagrams PD-1 through PD-n can also be used for comparison and filtering.

The filtering module 742 may analyze statistical similarities and differences between the reference path diagram PD-0 and the candidate path diagrams PD-1 through PD-n to eliminate some of the candidate path diagrams PD-1 through PD-n from further consideration by the similarity scoring system 740. For example, the comparison module 744 may ignore candidate path diagrams that are filtered, and the similarity scores 746 for these candidate path diagrams may be omitted or set to a default value (e.g., zero).

The filtering module 742 may filter the candidate path diagrams PD-1 through PD-n based on statistical variations from the reference path diagram PD-0 that are greater than a threshold value. The threshold values may be predetermined or may be dynamically determined (e.g., based on standard deviation values for the candidate path diagrams being analyzed). As an example, if the number of significant transitions (e.g., transition of heading greater than a threshold angle) in one of the candidate path diagrams PD-1 through PD-n differs from the number of significant transitions in the reference path diagram PD-0 by more than a threshold value, it can be filtered and removed from subsequent analysis. As another example any of the candidate path diagrams PD-1 through PD-n that corresponds to a length greater than a threshold length can be filtered and excluded from further consideration. As will be understood by persons of ordinary skill in the art, filtering techniques could also be applied to the paths (i.e., candidate paths P-1 through P-n) prior to creation of the path diagrams (i.e., candidate path diagrams PD-1 through PD-n).

The reference path diagram PD-0 and the candidate path diagrams that are not excluded by the filtering module 742 are passed to the comparison module 744 for analysis, which computes the similarity scores for each of the candidate path diagrams relative to the reference path diagram PD-0.

Path matching, or curve comparison may be performed by the comparison module using known analysis techniques. One example of a suitable technique is the Frechet distance function. For example, the Frechet distance between the reference path diagram PD-0 and each of the candidate path diagrams PD-1 through PD-n are computed. The similarity scores 746 are then determined based on the Frechet distance, with low Frechet distances corresponding to high similarity and high Frechet distances corresponding to low similarity.

As another example, the comparison module 744 may utilize well-known machine vision techniques including feature extraction and pattern matching to determine similarity of the candidate path diagrams PD-1 through PD-n to the reference path diagram PD-0.

In some implementations, the comparison module 744 may utilize machine learning techniques to determine similarity of the candidate path diagrams PD-1 through PD-n to the reference path diagram PD-0. In some implementations, for example, both the reference path diagram PD-0 and each of the candidate path diagrams PD-1 to PD-n may be represented as binary image arrays of known dimensions (e.g., 256×256 cells).

A trained deep convolutional neural network (CNN) may be incorporated in the comparison module 744 to determine the similarity scores 746 between the reference path diagram PD-0 and each of the candidate path diagrams PD-1 through PD-n. The path with the highest/best similarity score would be chosen as the most likely path. The CNN may be configured in a conventional manner, including convolutional layers that process the reference path diagram PD-0 and each of the candidate path diagrams PD-1 through PD-n, and fully connected layers that function to determine and output the similarity scores 746.

In an example implementation, the CNN may be trained using ground truth information that includes heading samples and absolute position information similar to that used to construct the reference path P1, in combination with the known actual path of the asset. This information may be obtained, for example, from assets that are not power constrained (e.g., motorized assets) and that constantly report location information. From this information a reference path diagram and a correct candidate path diagram can be generated and provided to the CNN as an example of a correct (e.g., 100% similarity) match. In addition, using techniques discussed previously with respect to generation of the candidate paths, incorrect candidate path diagrams can be provided to the CNN as training examples. By generating a large number of correct examples and corresponding incorrect examples in this manner, sufficient training information can be provided to the CNN to allow similarity scoring for unknown paths.

Figure 8:
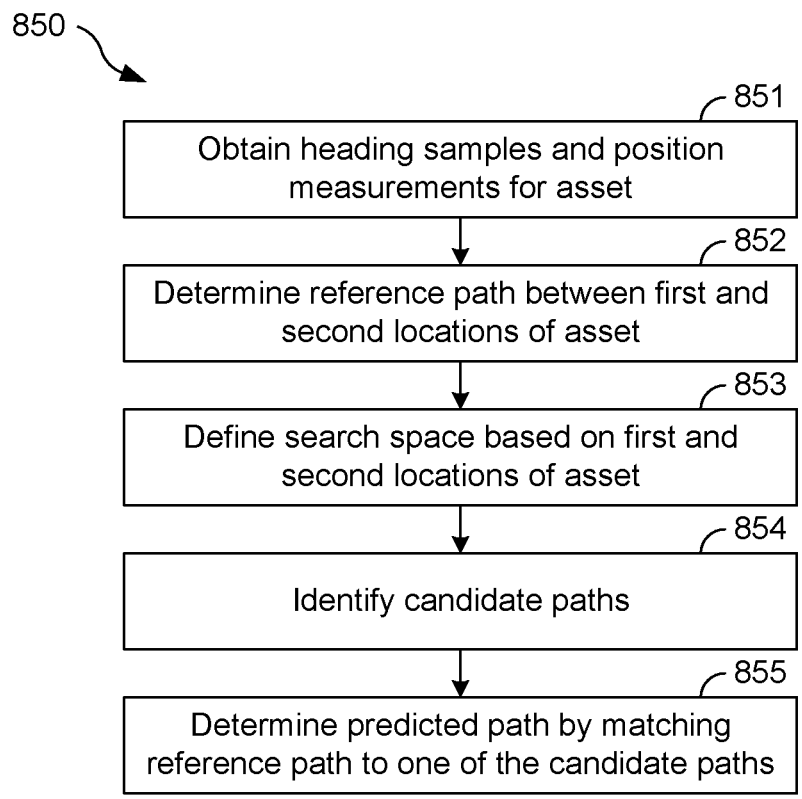
FIG. 8 is a flowchart that shows an example of a process for predicting the path of a cargo asset.

FIG. 8 is a flowchart that shows an example of a process 850 for predicting a path of an asset. The process 850 can be implemented using a computing device, such as a computing device that is associated with the asset tracking servers 108. As an example, a computing device may include a processor and a memory that stores computer program instructions. The computer program instructions, when executed, cause the computing device to perform the functions described herein with respect to the process 850.

In operation 851, information regarding an asset including heading samples and position measurements are obtained. This information may be in the form described with respect to the heading samples 532 and the absolute position measurements 534. The information originates from one of the cargo asset tracking devices 104 and can be obtained by receiving a transmission from one of the cargo asset tracking devices 104 or by accessing the information from a data storage device or system. In operation 852, a reference path between a first location of the asset and a second location of the asset is determined based on the heading samples and position measurements.

In operation 853, a search space is defined based on the first location of the asset and the second location of the asset from the position measurements obtained in operation 851 and using map information, such as the map information 536. The search space may be defined in the manner previously described with respect to FIGS. 5-6.

In operation 854, candidate paths are identified. The candidate paths are identified by locating, within the search space, valid paths between the first location and the second location.

In operation 855 the predicted path of the asset is determined by matching the reference path to one of the candidate paths. Matching can be performed using filtering and/or similarity scoring as previously described.

Once the path for the cargo asset is known or predicted, it can be used to compute distance traveled (mileage) and a cumulative virtual odometer created for the cargo asset. It can also be displayed on a map, described in a report, or otherwise be conveyed to users.

In a trailer yard with hundreds or thousands of trailers all looking generally the same, many times a truck driver/operator may attach his/her truck to the wrong trailer. So, in such situations, an appropriate alert/notification is desired, if it could be determined that there is no tractor/engine (motorized asset) belonging to the organization that is moving along the same path as the cargo asset at that time. This may be indicative of the cargo asset being mistakenly (or intentionally) transported by an unauthorized motorized asset.

Figure 9:
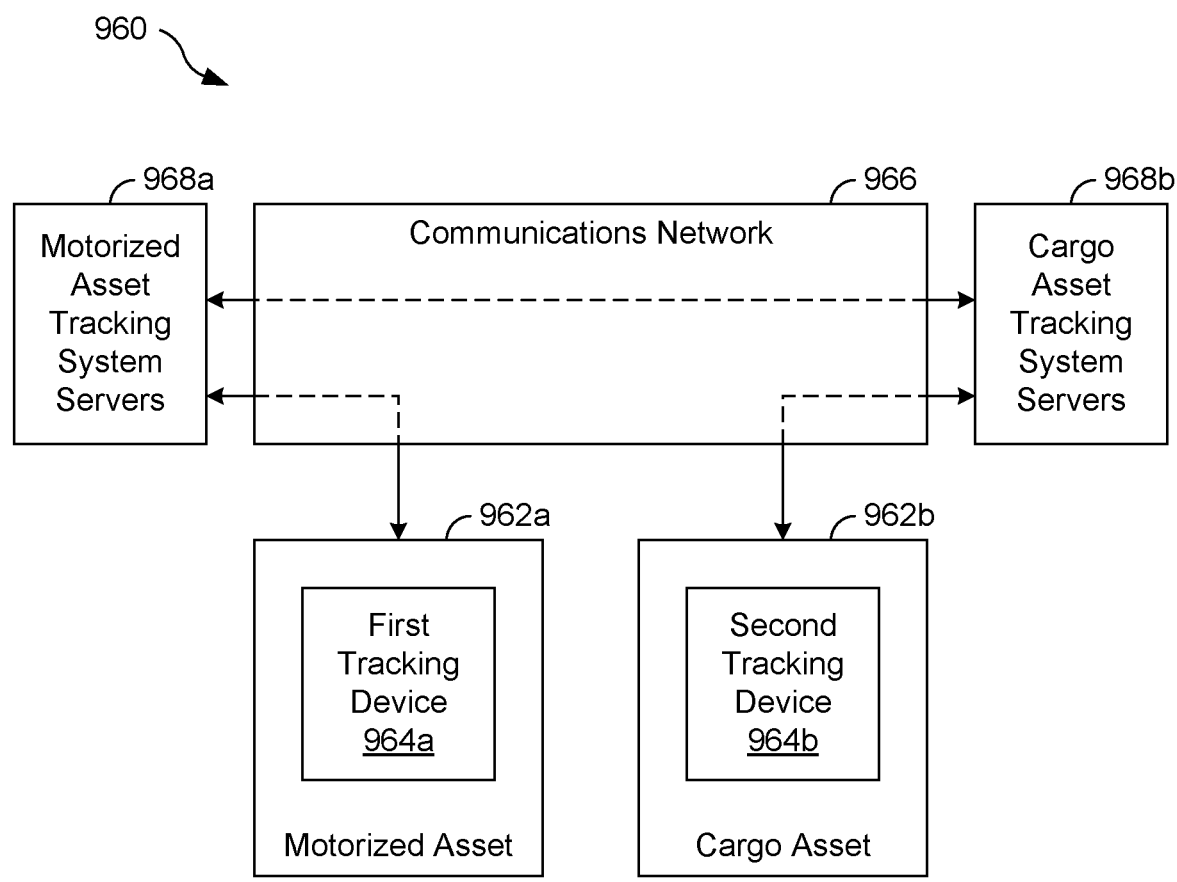
FIG. 9 is a block diagram that shows an example of an asset matching system.

FIG. 9 is a block diagram that shows an example of an asset matching system 960 that is operable to determine a match between a motorized asset (e.g., a semi-trailer truck) and a cargo asset (e.g., a semi-trailer). The asset matching system 960 is similar to the asset tracking system 100, and the description of the asset tracking system 100 is applicable, except as described herein. In the asset matching system 960, a motorized asset 962a includes a first tracking device 964a, and a cargo asset includes a second tracking device 964b. The first tracking device 964a used in the motorized asset and the second tracking device 964b used in the cargo asset may be implemented according to the hardware configuration of the cargo asset tracking device 104, with the exceptions noted here.

The first tracking device 964a may send location information at regular short intervals (e.g. once per ten seconds) to motorized asset tracking system servers 968a using a communications network 966 (e.g., cellular and/or satellite). As previously described, the motorized asset 962a includes a power source (e.g., a generator or a battery pack used to provide motive power) that is able to supply sufficient power to the first tracking device 964a for continuous operation, and it therefore is not power constrained. Because the motorized asset 962a is not power constrained, an integral battery is not needed for the motorized tracking device 964a. Further, since the motorized asset tracking device 964a is not power constrained, all modules (satellite positioning system receiver module 212, communications module 216, and heading sensor 214) can be powered on all the time and hence the power up/down, data sampling and sending sequences described with respect to FIG. 4 do not apply.

The second tracking device 964b may obtain heading information at regular short intervals (e.g. once per ten seconds) while the cargo asset 962b is moving and obtain location information at long intervals (e.g., once per fifteen minutes), and then periodically (e.g., every thirty minutes) transmit this information to cargo tracking system servers 968b using the communications network 966.

The motorized asset 962a and the cargo asset 962b are each representative of a large number (e.g., thousands) of similar assets. The motorized asset tracking system servers 968a receive, track, and store information representing the actual known positions and paths for the motorized assets. The cargo tracking system servers 968b may be configured in the manner described with respect to the asset tracking servers 108, including the path prediction system 530, such that they are configured to implement the process 850 for predicting a path of an asset as previously described. The cargo tracking system servers 968b are also in communication with the motorized asset tracking system servers 968a (e.g., via an API) to obtain information regarding the locations and paths of the motorized assets. As will be explained, this allows the cargo tracking system servers 968b to identify one of the motorized assets as being connected to and actively transporting one of the cargo assets, by correlation of the time of activity, position and/or path of the cargo asset relative to one of the motorized assets.

Figure 10:
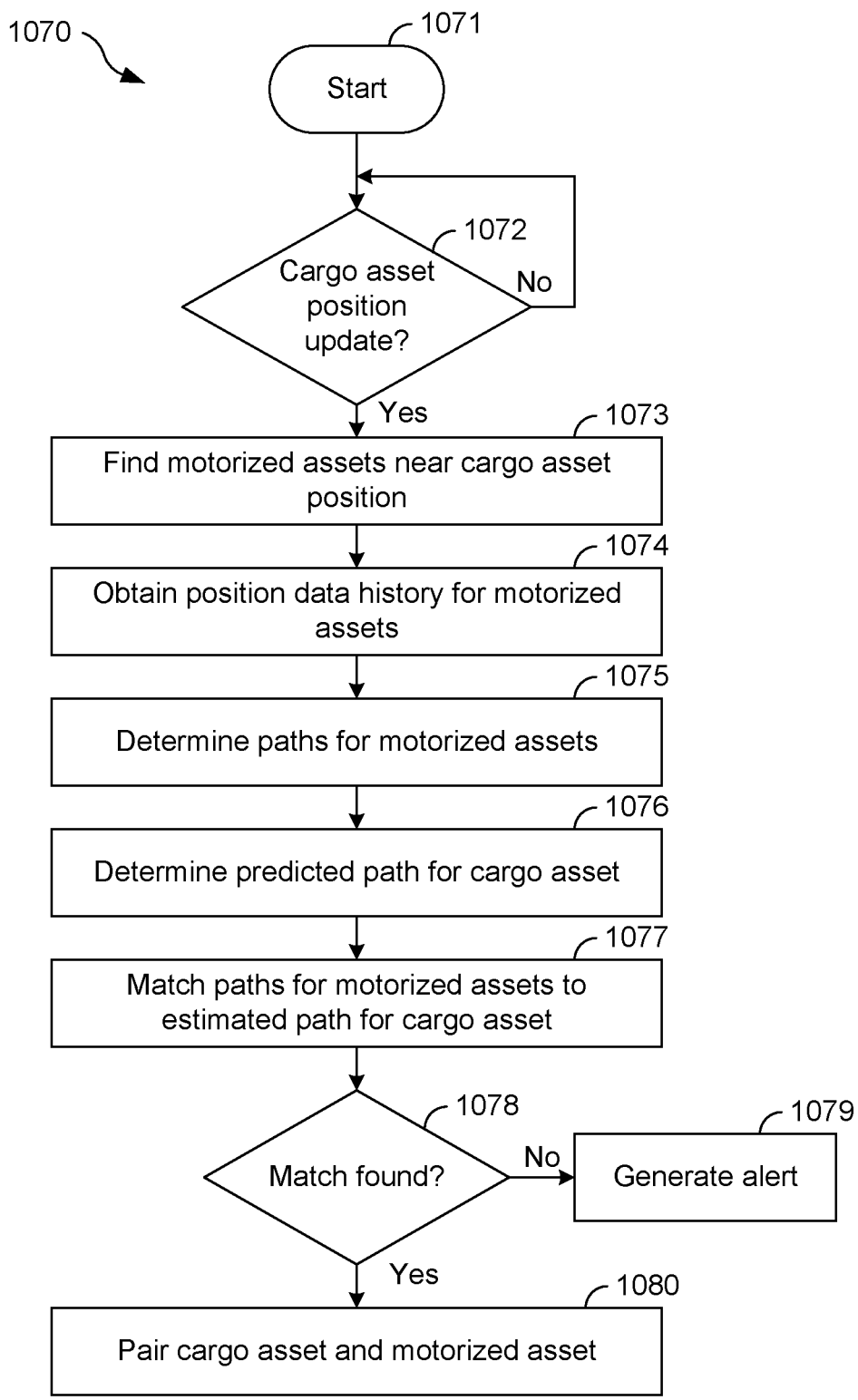
FIG. 10 is a flowchart that shows an example of a process for asset matching.

FIG. 10 is a flowchart that shows an example of a process 1070 for asset matching. The process 1070 can be implemented using a computing device, such as a computing device that is associated with the cargo tracking system servers 968b. As an example, a computing device may include a processor and a memory that stores computer program instructions. The computer program instructions, when executed, cause the computing device to perform the functions described herein with respect to the process 1070.

The process starts in operation 1071 and proceeds to operation 1072 where it is determined whether a position update has been received (e.g., at a server computer) from a cargo asset. If a position update has been received the process proceeds to operation 1073. Otherwise, operation 1072 is repeated to continue monitoring for receipt of a position update.

At operation 1073, the position update received from the cargo asset is used to find motorized assets that are near the reported position of the cargo asset at that time. For example, motorized assets within a threshold distance of the cargo asset can be identified. The motorized assets are identified, for example, by obtaining information from the motorized asset tracking system servers 968a by a request (e.g., API call) from the cargo tracking system servers 968b, which causes transmission of the information. The request may specify the time associated with the position update from the cargo asset if the position is not a current (e.g., real-time) position.

At operation 1074 position data history is obtained for the motorized assets that were identified in operation 1073. The position history data may be in the form of a route along a transportation network. At operation 1075, the position history data is used to determine, for each of the motorized assets being analyzed a path that each motorized asset has traveled from a respective initial position to a respective current position. This information can be expressed, for example, in the form of a list of transportation network segments (e.g., road segments or rail segments).

In operation 1076, a predicted path is determined for the cargo asset. The predicted path for the cargo asset can be determined in the manner previously described with respect to determination of the predicted path 538 by the path prediction system 530. As previously described, this prediction can be made using position information at a low sampling rate and heading information at a higher sampling rate to determine an estimated path and match the estimated path to valid paths from the map information. In operation 1077 the predicted path of the cargo asset is compared to the known paths for the motorized assets. To determine an appropriate match, this comparison may be a strict comparison (e.g., requiring perfect correspondence of paths) or a similarity comparison that is satisfied when the similarity is greater than a threshold value. In addition to similarity of the route (e.g., list of segments traveled) similarity may also be judged based on time correlation between the paths for the cargo asset and the motorized asset.

In operation 1078, a determination is made as to whether a match has been found. If a match is found, the process proceeds to operation 1080. Otherwise, the process proceeds to operation 1079, where an alert is output indicating that no match is found. The alert may be useful, for example, in determining that a cargo asset is being transported by an inappropriate motorized asset (e.g., the wrong cargo asset is being transported by mistake).

In operation 1080, the cargo asset and the motorized asset are paired. Further tracking can assume that the position of the cargo asset is the same as the position of the motorized asset. This is useful because the tracking device for the motorized asset is not power-constrained and can send frequent position measurements for tracking. Periodically, the cargo asset also reports its position, and the positions reported by the motorized asset and the cargo asset can be compared to verify that the cargo asset is still being transported by the motorized asset (i.e. to periodically verify co-location of the cargo asset and the matching motorized asset).

Once a match of two assets (e.g., tractor-to-trailer) is established, traditional telematics functionality that are available to a motorized asset (speeding, estimated time of arrival, geo-fence violation, assignment and identification of drivers, etc.) can be automatically incorporated (or provided) for the attached cargo asset.

Those skilled in the art would recognize that matching multiple trailers that are pulled by a single truck (e.g., in a doubles arrangement, double pups arrangement, or other similar arrangement) can be achieved similar to the tractor—trailer matching arrangement described here with a few minor exceptions. In the case of two trailers with autonomous battery powered devices, and no tractor telematics information, the paths predicted/generated would be within each time window would be matched to see if the trailers are traveling together in a doubles arrangement.

There are situations where a long-life battery powered tracking device (such as the cargo asset tracker described here) may be used in a motorized asset. For example, a battery powered device intended for convenient installation (similar to a windshield mounted toll tag) may be useful for monitoring motorized assets belonging to third parties (such as a truck or car leasing company) being temporarily used by an organization. Alternately, one might want a system/device that is installed in a non-obvious location and that does not depend on the power derived from the motorized asset for security purposes (e.g., the device has no wires, etc. leading up to it). Typically, as a process for defeating built-in tracking devices in a motorized asset, thieves may detach the motorized asset's electrical power source (battery/alternator) and then transport the motorized asset. A self-contained battery powered device capable of intermittently reporting position (without relying on external power) is useful in these situations. The cargo asset path prediction methods and techniques described here are equally valid in these situations as well.

Although the description herein is made with reference to particular implementations, it should be understood that numerous alternative implementations are available, as will be apparent to persons of ordinary skill in the art.

The invention claimed is:

1. A method, comprising:
    obtaining position information describing a first location of first asset at a first time value using a satellite positioning system receiver;
    placing the satellite positioning system receiver in a powered down state during a predetermined interval subsequent to obtaining the position information describing the first location, wherein position information describing a location of the first asset is not obtained while the satellite positioning system receiver is in the powered down state;
    obtaining heading samples for the first asset while the satellite positioning system receiver is in the powered down state during the predetermined interval;
    placing the satellite positioning system receiver in a powered up state subsequent to obtaining the heading samples for the first asset during the predetermined interval;
    obtaining position information describing a second location of the first asset at a second time value subsequent to placing the satellite positioning system receiver in the powered up state;
    determining a reference path for the first asset from the first location to the second location based on the heading samples;
    identifying candidate paths from the first location to the second location using map information by searching the map information for routes from the first location to the second location that fall within a search space determined according to a time period between the first time value and the second time value;
    determining a predicted path for the first asset by matching the reference path to one of the candidate paths; and
    matching the predicted path for the first asset with a second asset, wherein power consumption of the first asset is constrained and power consumption of the second asset is not constrained.

2. The method of claim 1, wherein the heading samples have a sampling frequency at least four times higher than a sampling frequency of the position information.

3. The method of claim 1, wherein the candidate paths determined using an assumed speed for the first asset.

4. The method of claim 1, wherein each of the candidate paths is a valid route from the first location to the second location using transportation network segments from the map information.

5. The method of claim 1, wherein determining the predicted path includes determining a similarity score for each of the candidate paths relative to the reference path.

6. The method of claim 5, wherein the predicted path is determined as the one of the candidate paths having a highest similarity score.

7. The method of claim 6, wherein matching the reference path to one of the candidate paths includes determining statistics for the reference path and statistics for the candidate paths, and excluding one or more of the candidate paths based on the statistics for the reference path and the statistics for the candidate paths.

8. The method of claim 1, wherein the search space is defined based on a distance that can be traveled by the first asset during the time period.

9. The method of claim 8, wherein a first area is defined around the first location according to the distance, a second area is defined around the second location according to the distance, and the search space is based on the first area and the second area.

10. The method of claim 9, wherein the search space is a geometric union of the first area and the second area.

11. The method of claim 10, wherein the first area and the second area are each circular areas centered at the first location and the second location, respectively, and having radii corresponding to the distance.

12. A method, comprising:
receiving a data transmission from a cargo asset at a tracking system, wherein the data transmission includes a first time-stamped absolute position measurement that corresponds to a first location, a second time-stamped position measurement that corresponds to a second location, and heading values corresponding to travel between the first location and the second location, and the data transmission does not include absolute position measurements corresponding to travel between the first location and the second location;
determining a reference path diagram for the cargo asset from the first location to the second location based on the heading values, wherein the reference path diagram is a time domain representation of the path traveled by the cargo asset between the first location and the second location;
identifying candidate paths from the first location to the second location using map information, wherein the candidate paths are spatial domain routes for travel between the first location and the second location using a transportation network;
determining candidate path diagrams for the candidate paths based on the candidate paths and an assumed speed, wherein the candidate path diagrams are time domain representations of the candidate paths;
determining a predicted path for the cargo asset by matching the reference path diagram to one of the candidate path diagrams; and
matching the predicted path for the cargo asset with a motorized asset, wherein power consumption of the cargo asset is constrained and power consumption of the motorized asset is not constrained.

13. The method of claim 1, wherein the heading samples have a sampling frequency at least ninety times higher than a sampling frequency of the position information.

14. The method of claim 1, wherein the predetermined interval corresponds to a predetermined number of the heading samples.

15. The method of claim 1, wherein the predetermined interval is at least fifteen minutes.

16. A method, comprising:
while movement of a first asset is detected, obtaining, heading samples for the first asset according to a predetermined time interval;
obtaining, according to a position sampling interval that corresponds to a predetermined number of heading samples, position information samples describing locations of the first asset using a satellite positioning system receiver;
between successive position information samples, placing the satellite positioning system receiver in a powered down state for a duration of the position sampling interval and subsequently placing the satellite positioning system in a powered up state;
determining a reference path for the first asset based on the heading samples;
identifying candidate paths between at least two of the locations of the first asset using map information; and
determining a predicted path for the first asset matching the reference path to one of the candidate paths; and
matching the predicted path for the first asset with a second asset, wherein power consumption of the first asset is constrained and power consumption of the second asset is not constrained.

17. The method of claim 16, wherein the predetermined number of heading samples is at least four heading samples.

18. The method of claim 16, wherein the predetermined number of heading samples is at least ninety heading samples.

19. The method of claim 16, wherein the predetermined time interval is at least ten seconds.

20. The method of claim 16, further comprising:
placing a sensor that obtains the heading samples in a powered down state while movement of the first asset is not detected and placing the sensor that obtains the heading samples in a powered up state while movement is detected.

* * * * *